Oct. 27, 1925.
E. F. COLLINS
1,559,076
OVEN
Filed Feb. 23, 1924
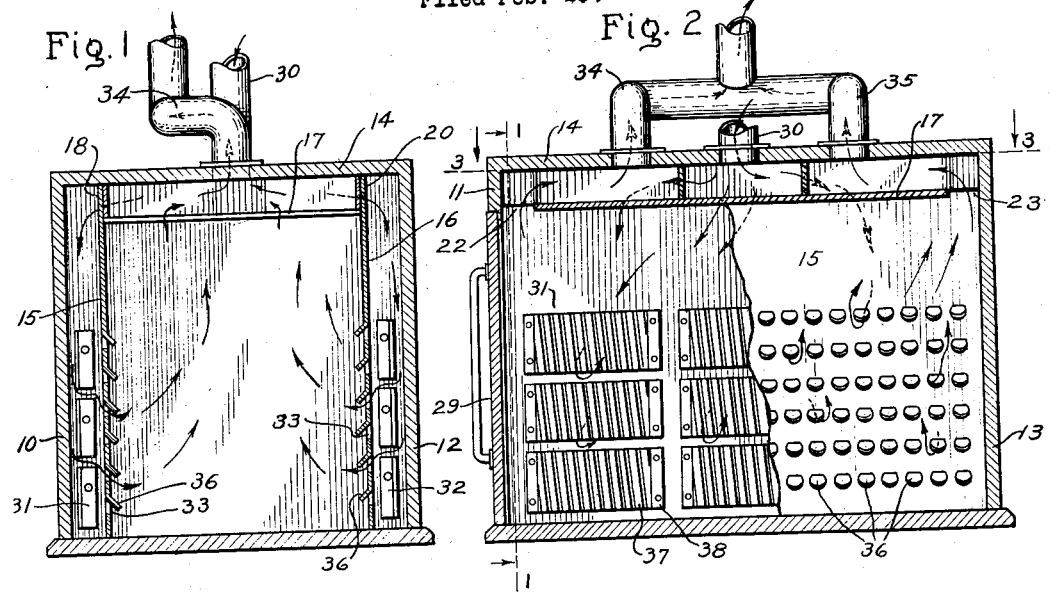
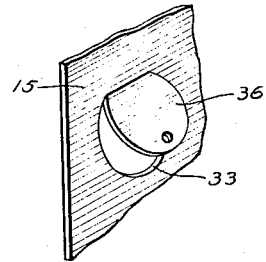
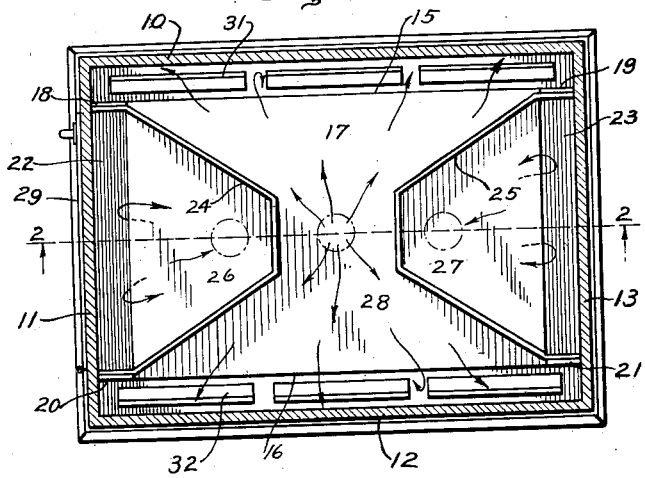
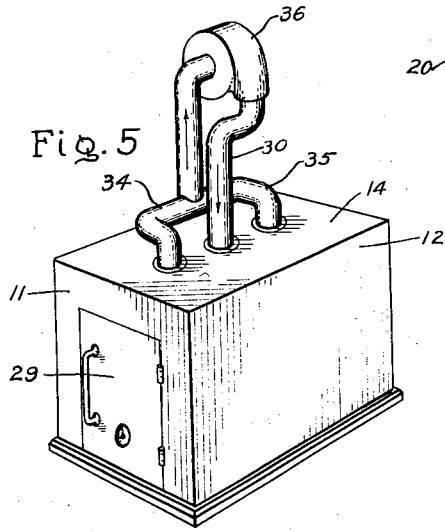
Inventor
Edgar F. Collins
by
His Attorney Patented Oct. 27, 1925.

1,559,076

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

OVEN.

Application filed February 23, 1924. Serial No. 694,610.

*To all whom it may concern:*

Be it known that I, EDGAR F. COLLINS, a citizen of the United States, residing at Schenectady, in the county of Schenectady, State of New York, have invented certain new and useful Improvements in Ovens, of which the following is a specification.

My invention relates to ovens and has for its object the provision of simple, reliable and efficient means for regulating the circulation of air in ovens.

My invention is particularly applicable to ovens having a forced circulation of air, although it is obviously applicable to various other types in which a circulation of air takes place. In carrying out my invention, I provide false side walls and a false ceiling forming baffles in the interior of the oven for directing the circulation of air. The source of heat for the oven is placed between the false side walls and the oven walls. The false side walls are provided with adjustable openings to permit the passage of air therethrough by striking out tongues or tabs in the false side walls.

For more complete understanding of my invention reference should be had to the accompanying drawing, in which Figure 1 is a sectional view taken along the line 1—1 of Figure 2, looking in the direction of arrows, of an oven embodying my invention; Figure 2 is a sectional view taken along the line 2—2 of Figure 3 looking in the direction of the arrows; Figure 3 is a sectional view taken along the line 3—3 of Figure 2, looking in the direction of arrows; Figure 4 is an enlarged fragmentary view in perspective showing the construction of the adjustable apertures in the baffle walls; while Figure 5 is a perspective view of the oven shown in Figures 1, 2 and 3. Referring to the drawing, I have shown my invention as applied to an electrically heated oven having a forced circulation of air, such as may be used in the baking of articles coated with japan or enamel. In accordance with my invention, I provide bafflles or false walls in the interior of the oven, by means of which the air is passed first over the electric heating means and then into the interior of the oven in contact with the articles which are to be baked. Inside the oven compartment formed by side walls 10, 11, 12 and 13 and the top wall 14, made of a suitable heat insulating material, are oppositely disposed parallel false side walls 15 and 16, and a false ceiling 17, all of which may be and preferably are made of sheet metal. The false side walls 15 and 16 are parallel with and spaced short distances away from the side walls 10 and 12 respectively of the oven. They fit tightly on the bottom of the oven and against the walls 11 and 13 at their ends. Portions 18, 19, 20 and 21 at the ends of the false side walls respectively extend upward to meet the top wall 14 of the oven so as to leave intermediate spaces over the tops of the false side walls communicating with the space above the false ceiling 17 which is parallel with and secured a short distance below the top wall 14. The intermediate portions of the side walls between the upwardly extending projections 18 to 21 inclusive, tightly engage with top edges respectively of the false ceiling wall. It will thus be observed that the two false side walls 15 and 16, form with the false ceiling 17 an inverted U shaped member in the interior of the oven. The articles to be baked may be placed in the oven chamber thus formed inside the U shaped member through a suitable door 29. The false ceiling wall 17 is considerably shorter than the length of the oven between its side walls 11 and 13 whereby spaces 22 and 23 are provided between the ends of the ceiling wall 17 and the side walls 11 and 13 respectively.

Between the false ceiling 17 and the top wall 14 are two baffles 24 and 25 made of strips of metal having a width equal to the distance between the false ceiling 17 and the top wall 14. These baffles are bent in substantially the shape of a V and are placed on the false ceiling 17 with the points of the V extending towards each other and with their ends connected to the projections 18 to 21 inclusive of the false side walls. By means of these two baffles, the upper portion of the oven above the false ceiling 17 is thus divided into three separate compartments 26, 27 and 28, the compartments 26 and 27 leading downward into the oven chamber, while the compartment 28 extends across the top of the oven and leads downward into the spaces between the false side walls 15 and 16 and the adjacent walls of the oven.

By means of a suitable blower 36, the air in the interior of the oven is caused to circulate from the blower through pipe 30 into compartment 28, then downward behind the false side walls 15 and 16, over the electric heating units 31 and 32 behind the side walls, through apertures 33 in the side walls into the oven chamber, and from the oven chamber upward through spaces 22 and 23 at the ends of the false ceiling 17 into compartments 26 and 27 from which the air passes out through pipes 34 and 35 back to the blower.

The apertures 33 in the false side walls 15 and 16 are formed so that they may be conveniently adjusted to provide for concentration of the heated air in any particular section of the furnace as desired or for uniform distribution of heated air. As shown in the Figure 4, the apertures 33 are formed by striking out a tongue or tab 36 of the metal of the false side wall, which tab may be substantially circular. The tabs 36 may be readily bent downward or upward either before or after the installation of the oven to cut off or increase the supply of air at any particular portion of the oven as desired. Also any adjustment of the tabs for a particular distribution of air suitable for the use to which the oven is to be applied is fixed until the tabs are adjusted again. Thus the distribution of air may be easily adjusted and will remain as adjusted. Preferably the tabs are struck so as to be depending or secured at the top and project into the baking compartment, whereby the air as it enters the heating chamber is directed downward toward the bottom of the oven.

The heating units 31 and 32 may be of any suitable type. As shown, they consists of strips 37 made of an electrical resistance heating material, such as a nickel chromium alloy, wound on insulating supports 38.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an oven, of metallic baffle walls therein provided with apertures for the passage of air therethrough, means for producing a circulation of air through said apertures into said oven, and metallic tabs cooperating with said apertures adjusted to direct the air downward into said oven.

2. The combination with an oven, of metallic baffle walls in said oven spaced from the walls thereof, said baffle walls being provided with apertures for the passage of air therethrough, heating means behind said baffle walls, means for producing a circulation of air downward behind said baffle walls over said heating means and through said apertures into said oven, and tabs integral with said baffle walls cooperating with said apertures, said tabs being adjusted to direct the air downward into the interior of said oven.

3. The combination with an oven of oppositely disposed false side walls therein provided with apertures, electric heating means for the oven behind said false side walls, a false ceiling wall fitting between said false side walls and providing a space at each end for the passage of air, and circulating means for producing a flow of air downward behind said false side walls over said heating units through said apertures into the heating chamber, and then upward past the ends of said false ceiling wall back to said circulating means.

4. The combination with an oven of oppositely disposed false side walls therein provided with apertures, electric heating means for the oven behind said false side walls, a false ceiling wall fitting between said false side walls and providing a space at each end for the passage of air, and baffles between said false ceiling wall and the top wall of the oven whereby the air is directed downward over said heating units through said apertures into the heating chamber and then upward past the ends of said false ceiling.

5. The combination in an oven, of oppositely disposed false side walls therein provided with apertures, electric heating means behind said false side walls, a false ceiling wall fitting tightly between said false side walls and providing a space at each end for the passage of air, baffles between said false ceiling wall and the top wall of the oven providing compartments separately communicating with the spaces behind said false side walls and the interior of the furnace, and means exterior of said oven for causing a circulation of air from said means into said oven downward over said heating units through said apertures into the heating chamber and then upward and out past the ends of said false ceiling.

In witness whereof, I have hereunto set my hand this 21st day of February 1924.

EDGAR F. COLLINS.